(12) United States Patent
Beaufort

(10) Patent No.: US 8,573,119 B2
(45) Date of Patent: Nov. 5, 2013

(54) ROUND BALER

(75) Inventor: David Beaufort, Arc-les-Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/024,362

(22) Filed: Feb. 10, 2011

(65) Prior Publication Data
US 2012/0204739 A1    Aug. 16, 2012

(30) Foreign Application Priority Data

Feb. 17, 2010   (DE) .......................... 10 2010 002 012

(51) Int. Cl.
*B30B 5/06*       (2006.01)
*A01D 39/00*    (2006.01)

(52) U.S. Cl.
USPC .................... 100/88; 56/341; 100/87; 100/89

(58) Field of Classification Search
USPC .................................. 56/341; 100/87, 88, 89
See application file for complete search history.

(56) References Cited

U.S. PATENT DOCUMENTS

| | | | |
|---|---|---|---|
| 3,470,928 A * | 10/1969 | Schwartz | 383/117 |
| 4,366,665 A * | 1/1983 | VanGinhoven et al. | 56/341 |
| 4,433,619 A * | 2/1984 | Anstey et al. | 100/40 |
| 4,697,402 A * | 10/1987 | Anstey et al. | 53/506 |
| 4,922,690 A * | 5/1990 | Gusewell et al. | 53/587 |
| 6,073,433 A * | 6/2000 | Roth | 56/341 |
| 7,275,360 B2 * | 10/2007 | Viaud | 56/341 |
| 2006/0154542 A1* | 7/2006 | Underwood et al. | 442/82 |
| 2007/0101694 A1* | 5/2007 | Hood et al. | 56/341 |
| 2009/0107102 A1* | 4/2009 | Biziorek | 56/341 |
| 2010/0236427 A1* | 9/2010 | Derscheid | 100/5 |

FOREIGN PATENT DOCUMENTS

| | | | | |
|---|---|---|---|---|
| DE | 202004003052 | * | 7/2001 | ............. A01K 1/007 |
| DE | 10250425 | * | 10/2002 | ............. A01F 15/07 |
| DE | 10250425 A1 | * | 10/2002 | |
| DE | 202004003052 | | 7/2004 | |
| DE | 202006008868 | | 6/2006 | |
| WO | 03104537 | | 12/2003 | |

OTHER PUBLICATIONS

European Search Report, Dated: Jun. 28, 2011, 6 pgs.

* cited by examiner

*Primary Examiner* — Dana Ross
*Assistant Examiner* — Onekki Jolly
(74) *Attorney, Agent, or Firm* — Quarles & Brady LLP

(57) ABSTRACT

A device is provided for covering a bale chamber of a round baler. The device has a planar cover element made from a flexible material that extends between an upper holder and a brace moving between a lower, closed position, and an upper, open position for ejecting a round bale. The cover element consists of a fabric made from plastic fibers.

17 Claims, 6 Drawing Sheets

ROUND BALER

FIELD OF THE INVENTION

The invention relates to a device for covering a bale chamber of a round baler. The device is a planar cover element made from a flexible material that extends between an upper holder and a brace that can move between a lower, closed position and an upper, open position for ejecting a round bale. The invention also relates to a round baler equipped in this way.

BACKGROUND OF THE INVENTION

Round balers are used for producing bales made from stalk-like agricultural crops. Such round balers have a bale chamber and associated bale forming means. In typical round balers after completion of a bale, a rear door, on which rollers supporting or forming the bale forming means are mounted, is pivoted upward, in order to eject the bale.

Various constructions of round balers have been proposed (see e.g. EP 1 308 078 A1) wherein carrier holding elements support the belt-shaped bale forming means in the lower region of the bale chamber of the round baler. The carrier can be pivoted between this bale-forming position and a bale-ejecting position in which it is pivoted backward and upward and exposes a rear opening of the baler. For such round balers, there are elements, for example, the bale forming means, which move in the rear region during operation.

For such a round baler, DE 102 50 425 A1 proposes a rear protective device in the form of a roller blind, a plate, a tarp, or mesh-like, interconnected chain elements. The protective device is suspended with its upper end on frame extension arms and fixed at its lower end on pivoting braces that are pivoted upward before the ejection of the bale. For this purpose, a separate drive can be provided, or the pivoting braces can be coupled mechanically by means of Bowden cables to the carrier of the carrier. While a roller blind is wound onto an upper shaft, a tarp hangs downward when the pivoting braces are pivoted upward.

One disadvantage of the known protective device lies in that the material is subjected to considerable wear when it is wound or folded up. In particular, tarps made from typical plastic material, such as those used, for example, for covering the truck beds of trucks, quickly form unattractive folds at which they later tear.

The problem forming the basis of the invention is thus seen in providing a round baler in which the disadvantages mentioned above are not present or are present only in a reduced degree.

SUMMARY OF THE INVENTION

A device with a planar cover element made from a flexible material is used for covering the bale chamber of a round baler. The cover element is attached at its upper end to an upper holder and at its lower end to a brace that can be moved between a lower, closed position and an upper, open position for ejecting the round bale. The cover element is preferably a fabric made from plastic fibers.

The use of a fabric made from plastic fibers as a cover element guarantees a long service life of the cover element, because the fabric can be more easily folded or rolled up than single-piece, planar materials, such as tarps, and in this way also experiences less damage. Thus, a long service life of the cover element and low driving-power requirements for the movement of the cover element are achieved.

A preferred material for the fabric is polypropylene. A suitable thread strength is 1000 denier (den), wherein the individual thread is composed of multiple filaments. The production of the fabric can be performed, in particular, by means of a Raschel machine. A suitable fabric is available from the company Agripool S.r.l., Desenzano d/G, Italy, under the designation Agri Cow.

Furthermore, the fabric is advantageously permeable to air. In this way, in the interior of the baler, air flows generated by the rotating bale and the crop take-up device can flow out without a problem. Also, an undesired susceptibility to wind, particularly in the folded state, by the cover element is prevented.

In order to improve the stability of the device, several braces are provided that are coupled with the element at a distance from each other. In this way, the element, in the closed position, forms a polygon whose outline attaches to the approximately cylindrical bale chamber.

The attachment of the fabric to the brace or braces can be accomplished by a loop of fabric into which the brace is pushed. The material of the fabric can be connected to the loop by a seam or by a bonded or welded joint. Any other means of affixation, however, can also be conceivable, such as binding elements guided through holes in the fabric (such as hose clamps, cable binders, and the like) or direct connections between the brace and the fabric, such as a bonded joint.

The cover element can consist of a single-piece of fabric or of several parts that are coupled with each other advantageously in the region of one or more braces. For this purpose, a seam or bonded joint could likewise be provided or the parts can be connected to each other by slide fasteners or mechanical connecting elements. Thus, the braces or connecting elements connected in this way can be provided with indentations in which a loop of the cover element is placed and held tight there by a rod inserted into the loop.

In order to cover the round baler not only at the back, but also at the sides, the brace or braces are formed with a U-shaped construction, i.e., with three legs, with the cover element attached to all three legs of the braces.

The cover element can be attached rigidly to the upper holder, that is likewise connected in an immovable manner to the baler, so that it hangs downward or toward the back when the brace is brought into the upper position. The brace or braces are pivoted upward about an axis or moved upward in a linear motion. It is also conceivable, however, to provide the holder with a shaft on which the cover element is wound up like a roller blind.

The described device is suitable especially for a round baler with a bale chamber and bale forming means supported by a carrier that can be moved for discharging a bale. Such a round baler is known from DE 102 50 425 A1. The device covers the bale chamber at the back, in order to prevent the risk of accidents and to shield the bale chamber from environmental effects.

In a preferred embodiment, the (sole or lowermost) brace is locked in the lower, closed position on the frame of the round baler, in order to prevent an undesired opening of the cover element. During a movement for discharging a bale, the carrier first opens the lock and then transports the brace into the upper position. In this way, a separate drive for the brace is eliminated. After ejection of a completed bale, the carrier moves back into its bale-forming position. The brace is then led just by the force of gravity into the lower, closed position and is locked there automatically. In this way, damage to the device for covering the bale chamber is prevented even if, under the most unfavorable circumstances, a bale is still located in its range of motion. The pivoting axes of the carrier and the brace or braces are advantageously coaxial, but they could also be arranged at a spaced distance from each other. This embodiment is not limited to cover elements made from a fabric made of plastic fibers, but instead could be used with cover elements made from any materials.

BRIEF DESCRIPTION OF THE DRAWINGS

In the description that follows the preferred embodiments of the invention are described in detail with reference to the accompanying drawings wherein.

DESCRIPTION OF THE PREFERRED EMBODIMENT

Figure 1:
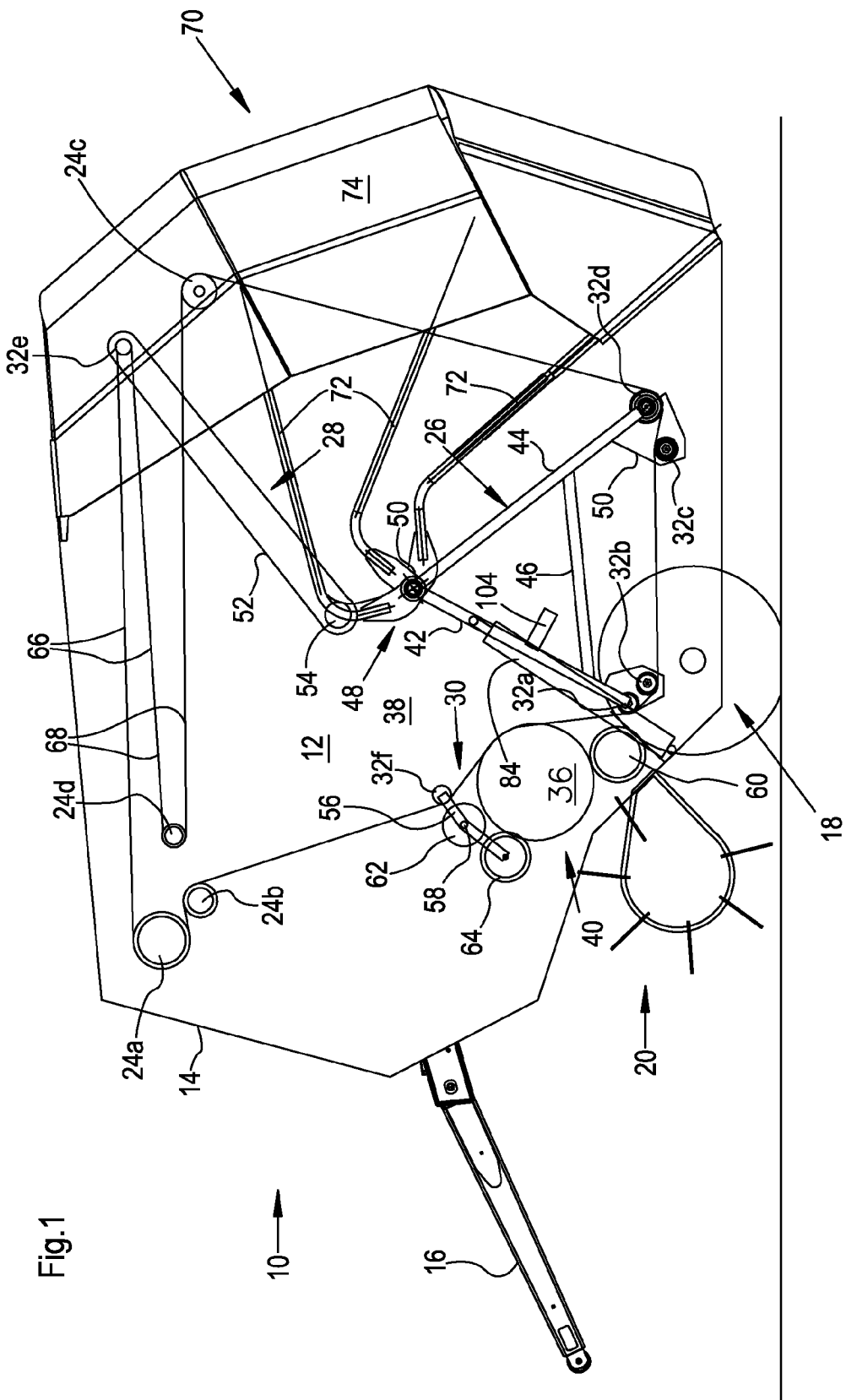
FIG. 1 is a schematic side view of a round baler with a device for covering the bale chamber in a slightly filled operating state.

In FIG. 1 an embodiment of a round baler 10 is shown that has a frame 14 supported on a running gear 18. On the front side of the frame 14 there is a drawbar 16, for attaching the round baler 10 to a tractor and to pull it across a field. A take-up device 20 in the form of a Pick-Up is used for taking up crop lying on the ground, e.g., hay or straw laid in a swath. The crop taken up by the take-up device 20 is fed to the inlet of a bale chamber 12 and is rolled up there in a spiral shape into a round-cylindrical bale 36, bound, and then laid on the ground.

A lower, stationary roller 60 and two upper rollers 62, 64 are positioned at the inlet 40 of the bale chamber 20. The bale chamber 12 is further formed by an endless bale forming means 34 in the form of a belt that is guided about a plurality of stationary rotating bodies 24 and movable rotating bodies 32. While the bale chamber 12 is essentially surrounded by the bale forming means 34 on the periphery, it is closed on the sides by sidewalls 38.

Four of the rotating bodies 32a, 32b, 32c, and 32b are each supported in pairs on the end of a delta-shaped carrier 26 so that they can rotate freely, with this carrier being formed with a first leg 42 and a second leg 44 connected to one another by means of a brace 46. The first and second legs 42 and 44 meet in a support 48 that is held on a support part 50 on the outside of the sidewall 38. The support part 50 is located directly at or close to the center of the bale chamber 12 or the sidewall 38.

On each side of the round baler 10 there is a carrier 26 and a support part 50, on the outer side of the sidewall 38.

Figure 3:
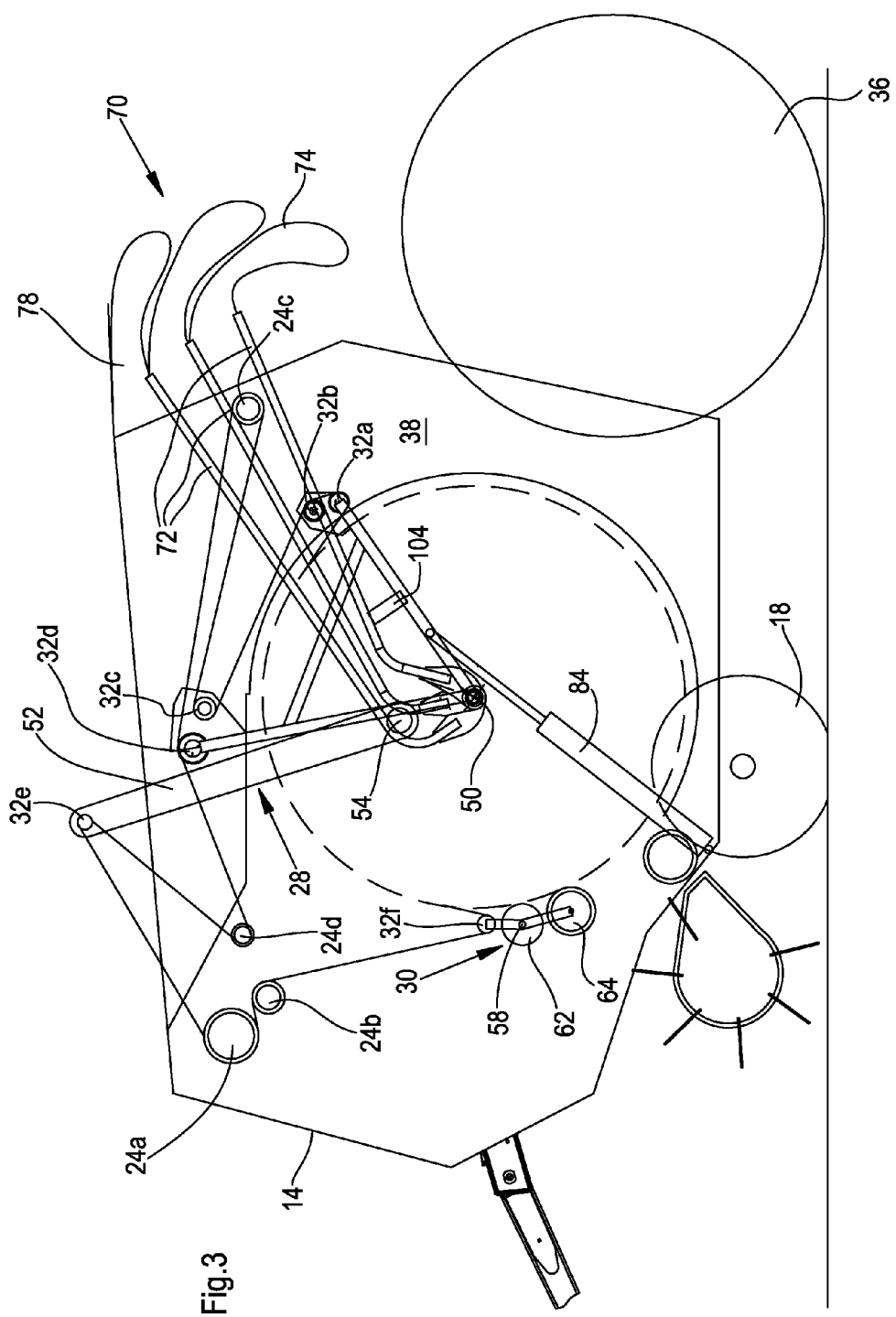
FIG. 3 is the round baler according to FIG. 1 during the unloading process.

The adjustment of the carrier 26 is carried out by means of an actuator 84 that can be in particular, a hydraulic cylinder. The carrier 26 can pivot between two end positions, namely a lower position in which the rotating bodies 32a-32d are located essentially close to a horizontal plane underneath the bale chamber 12 and a position that is offset upward by approximately 180° and in which the rotating bodies 32a, 32d of the second leg 44 come to lie between the body lying between them and the rear, stationary rotating bodies 24d and 24c as shown in FIG. 3.

A tensioning mechanism 28 for tightening the bale forming means 34 comprises a tensioning arm 52, a moving rotating body 32e arranged on the radially outward-lying end region of the tensioning arm 52, and a tensioning element (not-shown). The tensioning arm 52 is supported in a support 54 so that it can pivot vertically in the region of the sidewalls 38 above and in front of the support part 50 and extends until above the plane across which the stationary, upper rotating bodies 24 are arranged. The tensioning element is constructed in a typical way as a mechanical spring or as a hydraulic motor that can be moved against a possibly variable resistance. Such a resistance could be constructed by means of an advantageously adjustable choke in a hydraulic circuit, as is well known. The measure of the resistance simultaneously determines the density and the maximum weight of the bale 36.

The upper rollers 62, 64 and the rotating body 32f are mounted on a pivoting carrier 30 comprising a frame 56 that is supported so that it can pivot vertically in its middle region about a pivot axis 58. The rotating body 32f and the rollers 62, 64 are supported so that they can rotate freely in the frame 56, wherein the roller 62 runs coaxial to the pivot axis 58. The frame 56 can be biased into a certain position by means of a tensioning element.

The bale forming means 34 runs, among other things, above the stationary rotating bodies 24 and the moving rotating bodies 32 and is always set by means of the tensioning mechanism 28 tightly against at least one stationary rotating body 24 that is driven to rotate, so that its entrainment is guaranteed. The bale forming means 34 assumes a starting state in which, stretched straight, it bridges the inlet 40 and an end state in which it wraps around the bale 36 like a large loop. The bale chamber 12 is thus variable in its size, i.e., its diameter increases with the size of the bale 36. During its formation, the bale 36 is located in the bale chamber 12 and is wrapped, for the most part, by the bale forming means 34, but falls out of the bale chamber 12, i.e., the space between the sidewalls 38, onto the ground as soon as—as described later—the carrier 26 is pivoted upward with the moving rotating bodies 32 in the counterclockwise direction when looking at the drawing.

The sidewalls 38 can be supported so that they can move perpendicular to the direction of travel, so as to reduce the contact force of the bale on their inner sides when the bale 36 is being ejected, so that this bale is discharged more easily and thus more quickly. It would already suffice, e.g., if the sidewalls 38 were set apart from each other by a few centimeters. The sidewalls 38 can be constructed to move with the carriers 26.

The function of the round baler 10 is as follows: as soon as no crop is fed to the round baler 10 and the bale chamber 12 is empty, the carrier 26 is located in its lower, front end position in which the first, front rotating body 32a on the first leg 42 is located close to the roller 60 and the rotating bodies 32a-32d are located close to an essentially horizontal plane. The tensioning arm 52 is forced backward. The pivoting carrier 30 assumes its farthest possible end position in the clockwise direction. A section of the bale forming means 34 extends across the inner sides of the rollers 60 and 64 and thus closes the inlet 40. This state is shown in FIG. 1.

As soon as crop is fed into the bale chamber 12 by means of the take-up device 20, the section of the bale forming means 34 is moved toward the interior of the bale-forming space 12, which has the effect that the tensioning arm 52 begins to move forward, in order to shorten the loops 66, 68 formed by the bale forming means 34 in the upper region of the round baler 10. Above a certain diameter, the bale 36 comes into contact with the rotating body 32f and the pivoting carrier 30 pivots with it in the counterclockwise direction. Here the roller 64 is moved into the bale chamber 12, and the bale 36 is moved away from the inlet 40, so that the incoming crop can be easily taken in. While the bale diameter increases, the carrier 26 remains in the position shown in FIGS. 1 and 2.

When the bale 36 has reached its largest diameter (see FIG. 3), the pivoting carrier 30 has reached its maximum position in the counterclockwise direction, and the tensioning arm 52 has assumed its front-most position in which the first loop 66 assumes its smallest length. The bale 36 rests at the front on the roller 60 and the adjacent first rotating body 32a. Incidentally, the bale 36 is held by the tension in the bale forming means 34 out of contact with the first and the second rotating bodies 32c, 32d and the belt sections running over these bodies. If necessary, between the two second legs 44, another roller (not-shown) could be provided on which the bale 36 is supported. When the bale 36 has reached its maximum size, the adjacent sections of the bale forming means 34 are prevented from contacting each other due to the radial offset of the first and second rotating bodies 32a and 32b on the first leg 42. In this state, the bale 36 can be bound with twine or wound with film or netting, so that it does not fall apart after discharge from the bale chamber 12.

After the bale 36 is completed, it can be ejected from the bale chamber 12, whereupon the carrier 26 is pivoted backward and upward in the counterclockwise direction. In particular, due to the attachment of the carrier 26 at or close to the center of the sidewalls 38, the bale 36 is dropped onto the ground after just a short pivoting movement of the carrier 26 of, e.g. approximately 90°. After a pivoting movement of, e.g., approximately 180°, the first rotating body 32a on the first leg 42 is located so far above the ground that the round baler 10 can be moved farther forward without bumping against the bale 36. As soon as the bale 36 is rolled out of the bale chamber 12, the carrier 26 is pivoted back downward into the position shown in FIG. 1. In this way, the bale forming means 34 is tensioned again, and thus the tensioning arm 52 is moved backward again. The embodiment of the baler shown is disclosed in detail in EP 1 308 078 A1. Other possible embodiments are described in DE 198 51 470 A1, DE 102 41 215 A1, and EP 1 264 531 A1. The disclosures of these documents are incorporated by reference into the present document.

Figure 2:
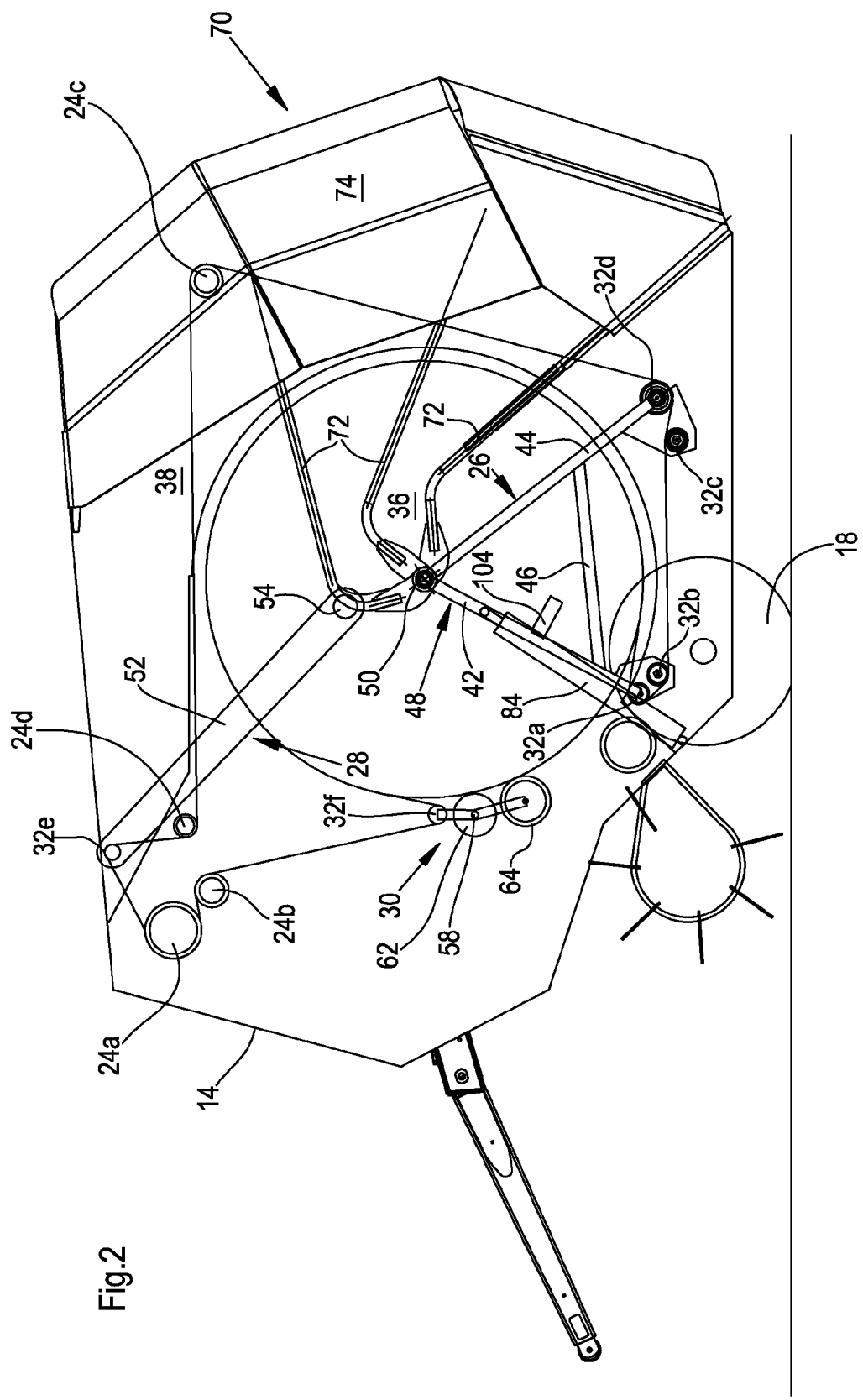
FIG. 2 is the round baler according to FIG. 1 in a filled state.

With reference to FIGS. 1-3 it can be seen that the round baler 10 is open at the back, so that the completed bale 36 can be ejected. On the back side of the round baler 10, there is a device 70 for covering the bale chamber 12. This device comprises three braces 72 that are each shaped, overall, with a U-shaped construction and comprise, accordingly, three legs. The outer legs are each attached at a distance from each other on the frame 14 so that they can rotate about the axis of the support 48. The middle legs of the braces 72, spaced apart from each other in the closed rest position shown in FIG. 1, are located at the back of the bale chamber 12 and each extend horizontally and perpendicular to the forward direction of the round baler 10. On the braces 72, a planar cover element 74 is attached that is made from an air-permeable fabric made preferably from plastic fibers. At its upper end (FIG. 4), the cover element 74 is coupled with a rigid, U-shaped brace 78 that is mounted, in turn, on a holder 76 coupled rigidly with the frame 14 and extends approximately horizontally, wherein its middle leg is located above and at the back of the bale chamber 12 and extends there horizontally and perpendicular to the forward direction of the round baler 10.

Figure 6:
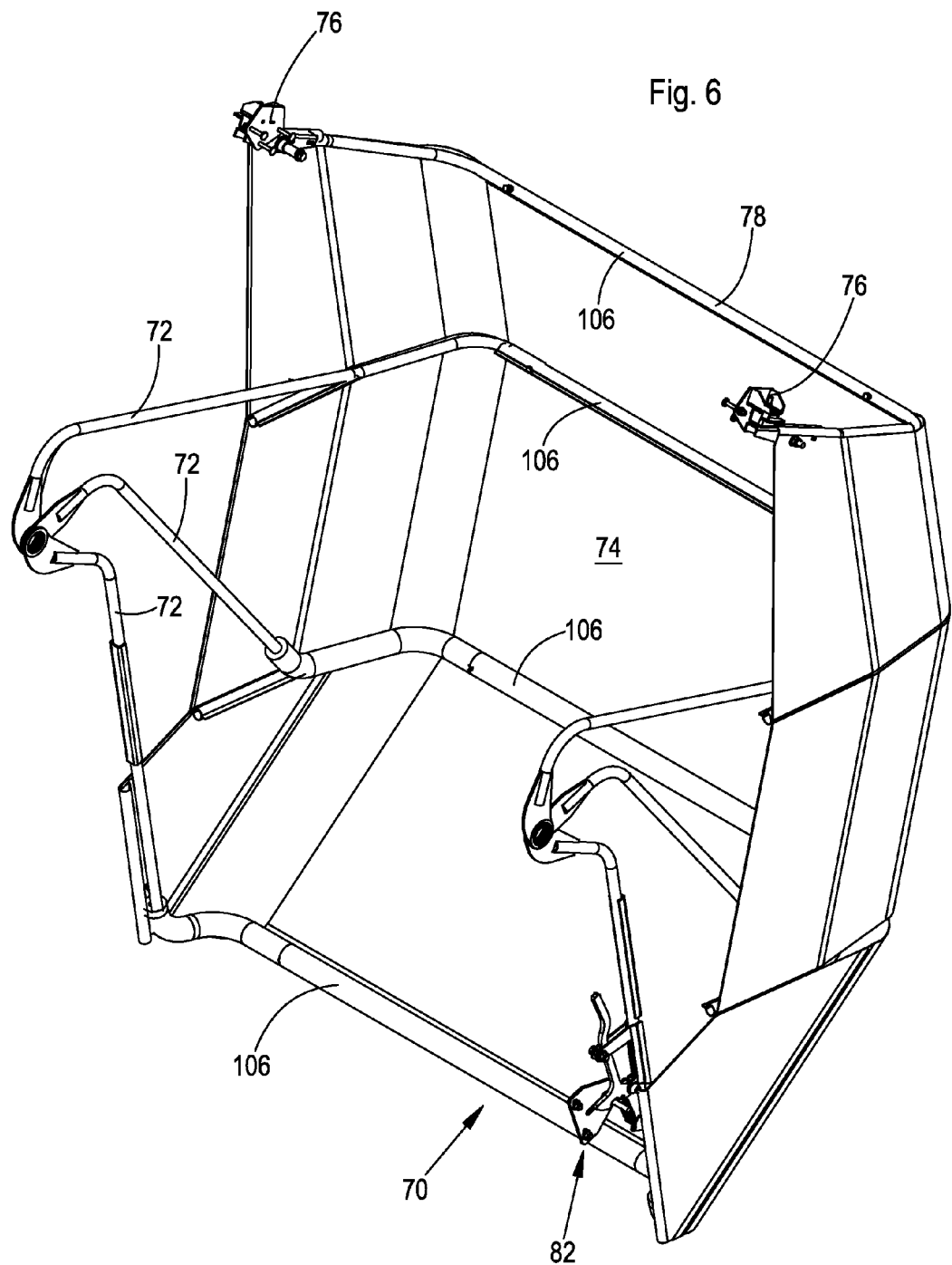

The cover element 74 extends along the middle leg of the braces 72, 78 and also a certain section extends along the outer leg of the braces 72, 78, so that they end in front of the rear contours of the sidewalls 38 (see FIG. 3) of the round baler 12 with respect to the forward direction of the round baler 12 in the rest position shown in FIG. 1 and a gapless covering of the bale chamber 12 is created. With reference to FIG. 6 it can be seen that the cover element 74 is assembled from a total of three parts that are sewn together at the braces 72 with the formation of loops 106 through which the braces 72 are passed. The cover element 74 also forms a sewn loop 106 around the brace 78, with the brace 78 being able to be passed through this loop.

Figure 4:
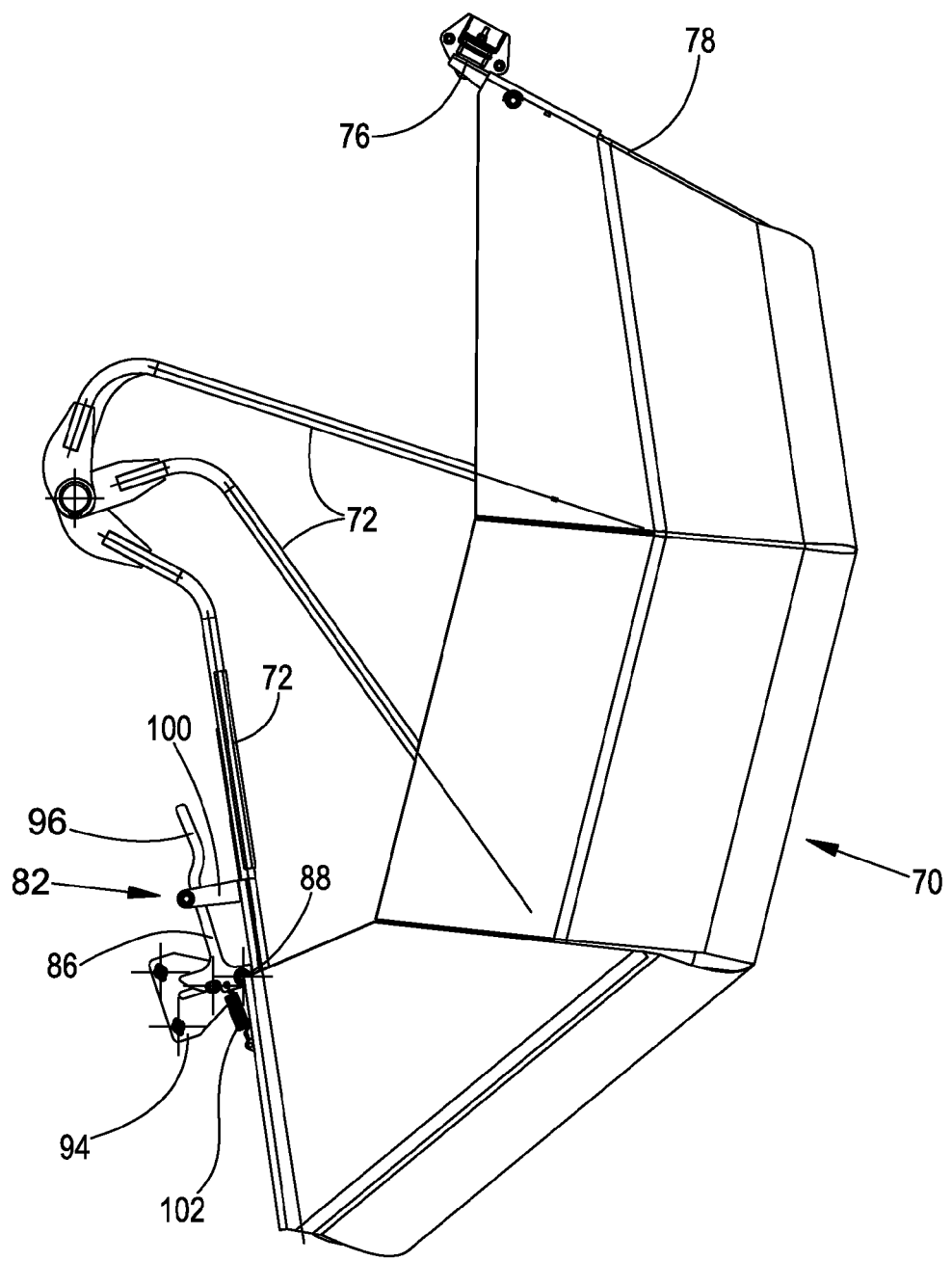
FIG. 4 is a side view of the device for covering the bale chamber.
Figure 5:
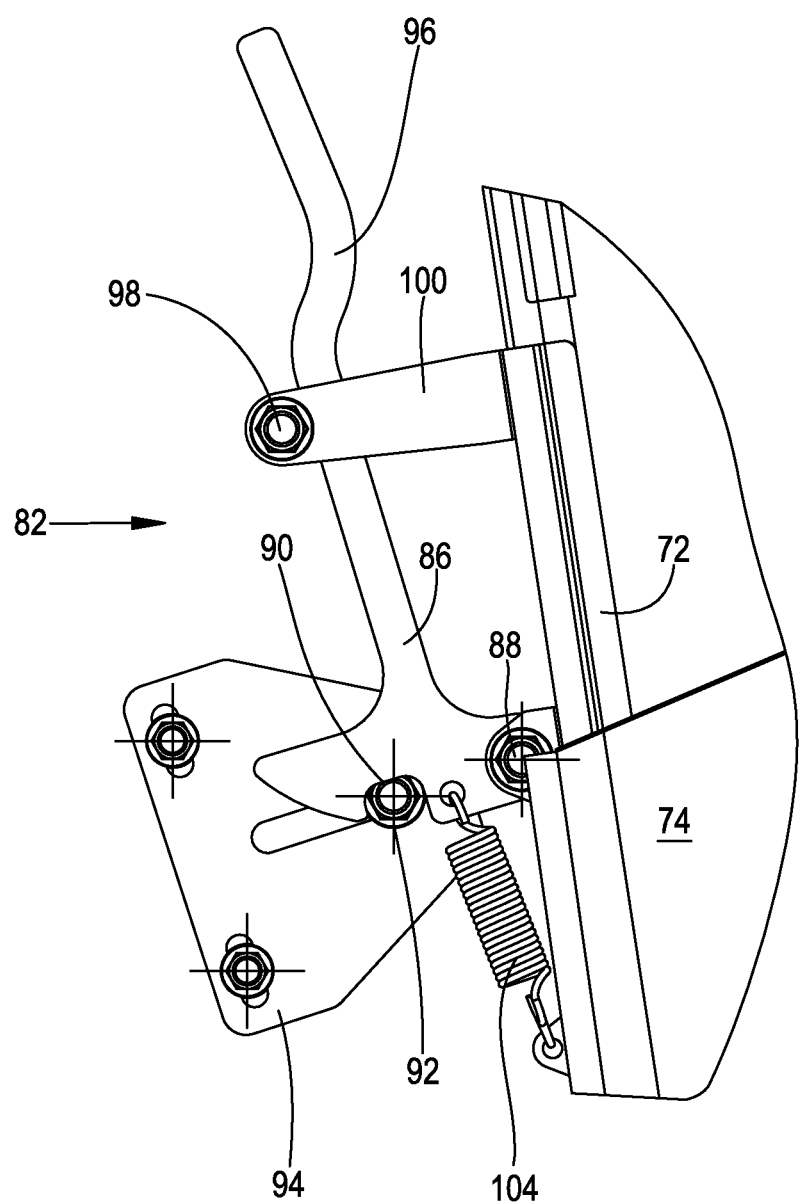
FIG. 5 is an enlarged diagram of the lock of the device for covering the bale chamber and, FIG. 6 is a perspective view of the device for covering the bale chamber, viewed from the front.

In FIGS. 4 and 5, a lock 82 of the lowermost brace 72 is shown. The lock 82 comprises a locking lever 86 that is attached to the lowermost brace 72 so that it can pivot about an axis 88 extending horizontally and perpendicular to the forward direction of the round baler 10. The locking lever 86 comprises an indentation 90 in which, in the locked position, a pin 92 engages. The pin 92 is mounted, on its side, on a plate 94 fixed rigidly on the frame 14 of the round baler 10. In the locked position, an upper lever arm 96 of the locking lever 86 contacts a stop 98 that is fixed on the lowermost brace 72 by means of a holder 100. A spring 102 biases the locking lever 86 in the shown locked position in which the pin 92 is located in the indentation 90 and the lever arm 96 contacts the stop 98. A catch 104 that can come into contact both with the lever arm 96 and also with the lowermost brace 76 is attached to the first leg 42 of the carrier 26, in order for a movement of the carrier 26 about the axis of the support 48 to first release the lock 82 and then to raise the lowermost brace 72 and, in succession, the other braces 72 and with them the cover element 74, as shown in FIG. 3. The catch 104 can comprise a damping element made from rubber or other suitable materials, in order to achieve a soft release of the lock 82 and a soft raising of the lowermost brace 72. A damping element acting in this way can be fixed alternatively or additionally on the lever arm 96 and/or on the brace 72.

In view of the foregoing, the functioning of the device 70 for covering the bale chamber 12 is as follows. In the rest position shown in FIGS. 1 and 2, the lock 82 is locked, so that the braces 72 and the cover element 74 are also locked and the bale chamber 12 is covered at the back. The rest position is maintained while forming a bale in the bale chamber 12. After the completion of a bale, if the carrier 26 is pivoted by the actuator 84 about the axis of the support 48, then the catch 104 comes into contact first with the lever arm 96 and rotates it with respect to FIGS. 4 and 5 in the clockwise direction about the axis 88. In this way, the indentation 90 is moved out of engagement of the pin 92. The lock 82 is thus detached. For further movement of the carrier 26, the catch 104 presses the lever arm 96 against the brace 72 (and/or the catch 104 attaches directly to the brace 72). Therefore, initially the lowermost brace 72 is rotated about the axis of the support 48 with respect to FIGS. 1-3 in the counterclockwise direction. Then, by the effect of the catch 104 and the lower brace 72, the next higher brace 72 and finally the uppermost brace 72 are also rotated about the axis of the support 48, until reaching the final position shown in FIG. 3 in which the cover element 74 forms, overall, three projections directed outward and downward. If the carrier 26 is pivoted downward again after the ejection of the bale 36, then only the force of gravity causes a lowering of the braces 72 and the cover element 74.

Thus, damage is prevented if a bale 36 is still located in the movement range of the device 70 for covering the bale chamber 12. Finally, the locking lever 86 is led back into the position shown in FIG. 5 in which it locks the device 70 on the frame 14 of the round baler 10.

Having described the preferred embodiment, it will become apparent that various modifications can be made without departing from the scope of the invention as defined in the accompanying claims.

The invention claimed is:

1. A device for covering a bale chamber of a round baler, the device comprising a planar cover element made from a flexible material that extends between an upper holder and a brace that can move between a lower, closed position and an upper, open position for ejecting a round bale, wherein the cover element consists of a fabric made from plastic fibers, wherein the brace has a U-shaped construction having three legs, and the cover element contacts all three legs of the brace.

2. A device according to claim 1, wherein the fabric is permeable to air.

3. A device according to claim 1, wherein the device further comprises several braces that move separately from each other and that are coupled with the cover element at a distance from each other.

4. A device according to claim 1, wherein the fabric is connected to the brace by a sewn loop through which the brace extends.

5. A device according to claim 3, wherein the cover element is one of a single piece construction and a multi-part construction wherein in a multi-part construction individual parts are connected to each other in the region of the braces.

6. A device according to claim 5, wherein the individual parts of the multi-part construction cover element are connected by one of seams, slide fasteners, bonded joints and mechanical connecting elements.

7. A device according to claim 1, wherein the upper holder and the region of the cover element mounted on the holder are connected in an immovable manner to the round baler, and wherein the cover element forms a projection when the brace is brought into the upper position.

8. A device according to claim 1, wherein the brace pivots about an axis.

9. A round baler with a bale chamber, bale forming means supported by a carrier that can be moved for discharging a bale, and a device for covering a bale chamber of a round baler, the device comprising a planar cover element made from a flexible material that extends between an upper holder and a-brace that can move between a lower, closed position and an upper, open position for ejecting a round bale, wherein the cover element consists of a fabric made from plastic fibers, wherein the brace(s) have a U-shaped construction having three legs, and the cover element contacts all three legs of the brace.

10. A round baler according to claim 9, wherein the fabric is permeable to air.

11. A round baler according to claim 9, wherein the device further comprises several braces that move separately from each other and that are coupled with the cover element at a distance from each other.

12. A round baler according to claim 11, wherein the fabric is connected to the brace by a sewn loop through which the brace extends.

13. A round baler according to claim 11, wherein the cover element is one of a single piece construction and a multi-part construction wherein in a multi-part construction individual parts are connected to each other in the region of the brace.

14. A round baler according to claim 13, wherein the individual parts of the multi-part construction cover element are connected by one of seams, slide fasteners, bonded joints and mechanical connecting elements.

15. A round baler according to claim 9, wherein the upper holder and the region of the cover element mounted on the holder are connected in an immovable manner to the round baler, and wherein the cover element forms a projection when the brace is brought into the upper position.

16. A round baler according to claim 9, wherein the brace pivots about an axis.

17. A round baler according to claim 9, wherein the brace is locked in the lower, closed position on the frame of the round baler, the carrier first opens the lock during a movement for unloading a bale and then brings the brace into the upper position, and the brace is led into the lower, closed position just by the force of gravity when the carrier is then brought back into the bale-forming position and the brace is automatically locked there.

* * * * *